(12) United States Patent
Traister

(10) Patent No.: US 8,504,784 B2
(45) Date of Patent: Aug. 6, 2013

(54) SCHEDULING METHODS OF PHASED GARBAGE COLLECTION AND HOUSEKEEPING OPERATIONS IN A FLASH MEMORY SYSTEM

(75) Inventor: Shai Traister, Sunnyvale, CA (US)

(73) Assignee: SanDisk Technologies Inc., Plano, TX (US)

( * ) Notice: Subject to any disclaimer, the term of this patent is extended or adjusted under 35 U.S.C. 154(b) by 344 days.

(21) Appl. No.: 11/769,033

(22) Filed: Jun. 27, 2007

(65) Prior Publication Data

US 2009/0006719 A1    Jan. 1, 2009

(51) Int. Cl.
*G06F 13/00*      (2006.01)

(52) U.S. Cl.
USPC .................. 711/158; 711/103; 711/168

(58) Field of Classification Search
USPC .......................... 711/103, 158, 168
See application file for complete search history.

(56) References Cited

U.S. PATENT DOCUMENTS

| | | | |
|---|---|---|---|
| 5,640,529 A | 6/1997 | Hasburn | |
| 5,912,848 A | 6/1999 | Bothwell | |
| 6,493,807 B1 | 12/2002 | Martwick | |
| 6,704,835 B1 * | 3/2004 | Garner | 711/103 |
| 6,763,424 B2 * | 7/2004 | Conley | 711/103 |
| 6,779,045 B2 * | 8/2004 | Kendall et al. | 710/5 |
| 7,093,071 B2 | 8/2006 | Rudelic | |
| 7,437,499 B2 | 10/2008 | Durante et al. | |
| 7,441,071 B2 | 10/2008 | Traister et al. | |
| 7,444,461 B2 | 10/2008 | Traister et al. | |
| 7,444,462 B2 | 10/2008 | Traister et al. | |
| 7,451,265 B2 | 11/2008 | Traister et al. | |
| 7,987,332 B2 | 7/2011 | Traister | |
| 2002/0051394 A1 | 5/2002 | Tobita et al. | 365/221 |
| 2002/0091826 A1 | 7/2002 | Comeau et al. | 709/226 |
| 2004/0089717 A1 | 5/2004 | Harari et al. | 235/441 |
| 2005/0073884 A1 | 4/2005 | Gonzalez et al. | |
| 2005/0091445 A1 * | 4/2005 | Chang et al. | 711/103 |
| 2005/0144365 A1 * | 6/2005 | Gorobets et al. | 711/103 |
| 2005/0172067 A1 | 8/2005 | Sinclair | 711/103 |
| 2005/0172074 A1 | 8/2005 | Sinclair | 711/114 |
| 2005/0172084 A1 | 8/2005 | Jeddeloh | |
| 2005/0195635 A1 | 9/2005 | Conley et al. | 365/149 |

(Continued)

FOREIGN PATENT DOCUMENTS

| | | |
|---|---|---|
| WO | WO 2006/120679 | 11/2006 |
| WO | WO 2008/115720 | 9/2008 |
| WO | WO 2009/003038 | 12/2008 |

OTHER PUBLICATIONS

Partial Search Report mailed Sep. 29, 2008 in Application No. PCT/US2008/068187.

(Continued)

*Primary Examiner* — Reba I Elmore
(74) *Attorney, Agent, or Firm* — Weaver Austin Villeneuve & Sampson LLP

(57) ABSTRACT

An embodiment of a non-volatile memory storage system comprises a memory controller, and a flash memory module. The memory controller manages the storage operations of the flash memory module. The memory controller is configured to assign a priority level to one or more types of housekeeping operations that may be higher than a priority level of one or more types of commands received by a host coupled to the storage system, and to service all operations required of the flash memory module according to priority.

21 Claims, 8 Drawing Sheets

U.S. PATENT DOCUMENTS

| | | | |
|---|---|---|---|
| 2006/0020744 A1 | 1/2006 | Sinclair et al. | 711/103 |
| 2006/0020745 A1 | 1/2006 | Conley et al. | |
| 2006/0136655 A1 | 6/2006 | Gorobets et al. | |
| 2006/0161724 A1* | 7/2006 | Bennett et al. | 711/103 |
| 2006/0161728 A1* | 7/2006 | Bennett et al. | 711/103 |
| 2006/0184718 A1 | 8/2006 | Sinclair et al. | |
| 2006/0184719 A1 | 8/2006 | Sinclair | |
| 2006/0184720 A1 | 8/2006 | Sinclair et al. | |
| 2006/0184722 A1* | 8/2006 | Sinclair | 711/103 |
| 2006/0239080 A1 | 10/2006 | Li | |
| 2007/0022241 A1 | 1/2007 | Sinclair | 711/100 |
| 2007/0028040 A1 | 2/2007 | Sinclair | 711/113 |
| 2007/0033376 A1 | 2/2007 | Sinclair et al. | |
| 2008/0034174 A1 | 2/2008 | Traister et al. | |
| 2008/0034175 A1 | 2/2008 | Traister et al. | |
| 2008/0082728 A1 | 4/2008 | Traister et al. | |
| 2008/0086619 A1 | 4/2008 | Traister et al. | |
| 2008/0235466 A1 | 9/2008 | Traister | |
| 2008/0235480 A1 | 9/2008 | Traister | |
| 2008/0294814 A1* | 11/2008 | Gorobets | 710/62 |
| 2009/0006720 A1 | 1/2009 | Traister | |

OTHER PUBLICATIONS

International Search Report and Written Opinion mailed Mar. 18, 2009 in Application No. PCT/US2008/068187.

U.S. Office Action mailed Sep. 17, 2009 in U.S. Appl. No. 11/769,038.

U.S. Final Office Action mailed Mar. 8, 2010 in U.S. Appl. No. 11/769,038.

EP Office Action mailed Nov. 4, 2010 in Application No. 08771928.2.

PCT International Search Report and Written Opinion dated Jul. 30, 2008 issued in PCT/US2008/056418.

PCT International Preliminary Report on Patentability and Written Opinion of the International Searching Authority dated Sep. 22, 2009 issued in PCT/US2008/056418.

Taiwanese Office Action dated Mar. 8, 2012 issued in TW 097108560.

PCT International Preliminary Report on Patentability and Written Opinion dated Jan. 5, 2010 issued in PCT/US2008/068187.

Taiwanese Office Action dated Nov. 15, 2011 issued in TW 097123547.

* cited by examiner

| Table A | |
|---|---|
| Priority | Operation Type |
| 1 | Housekeeping command needed for host command |
| 2 | Host command or internal applications command |
| 3 | Housekeeping operations (according to priority of housekeeping operation) |

FIG. 3A

| Table B | |
|---|---|
| Priority | Description |
| "00" | Abort / discard / suspend current operation and start execution of the memory operation immediately. Used in cases of emergency. |
| "01" | Abort / Discard / Suspend any lower priority operation and start execution of the new operation, after the completion of any higher priority operations. Used for operations that must be performed before the host commands are performed. |
| "02" | Abort / Discard / Suspend any lower priority operation and start execution of the new operation, after the completion of any higher priority operations. Used for host commands or for high priority housekeeping operations. The housekeeping operations will be scheduled to execute in the foreground (during write/read/erase timeouts) or in the background (during host idle period) |
| "03" | Abort / Discard / Suspend any lower priority operation and start execution of the new operation, after the completion of any higher priority operations. Used for medium priority house keeping operations. The housekeeping operations will be scheduled to execute in the foreground (during write/erase timeouts) or in the background (during host idle period) |
| "04" | Abort / Discard / Suspend any lower priority operation and start execution of the new operation, after the completion of any higher priority operations. Used for low priority house keeping operations. The housekeeping operations will be scheduled to execute in the background (during host idle period) |
| "05" | Abort / Discard / Suspend any lower priority operation and start execution of the new operation, after the completion of any higher priority operations. Used for very low priority house keeping operations. The memory operations will be scheduled to execute in the background only, during host idle period. |
| | |

FIG. 3B

SCHEDULING METHODS OF PHASED GARBAGE COLLECTION AND HOUSEKEEPING OPERATIONS IN A FLASH MEMORY SYSTEM

CROSS REFERENCE TO RELATED APPLICATIONS

This application is related to U.S. patent application Ser. No. 11/769,038, entitled, "SCHEDULING PHASED GARBAGE COLLECTION AND HOUSE KEEPING OPERATIONS IN A FLASH MEMORY SYSTEM," filed on the same day as the present application; and to U.S. patent application Ser. Nos. 11/726,648 and 11/726,646 all of which are hereby incorporated by reference in the entirety along with all documents referenced in this application.

BACKGROUND

The present application relates generally to the operation of flash memory, and more specifically to coordinating internal operations with commands received by a host.

A non-volatile memory system such as a flash memory card or drive is used by a host to store information. Therefore, a command received by the host should be serviced quickly and typically will have priority over whatever other operations may be taking place within the system.

Non-volatile memory storage systems may receive, transmit, or issue operations or instructions required to manage data in the memory. Most memory operations received or issued by the non-volatile memory storage system are executed immediately. However, due to different timing limitations (e.g., initialization timeout, write command timeout limitations, and other timing limitations), there might not be enough time allocated to completely execute a memory operation. As a result, the execution of the memory operation may be deferred until the next available timeslot or ignored until the next time the memory operation is triggered. A garbage collection operation is an operation initiated internally (not by a host) to manage the data of the memory system and ensure its reliability. Such operations are initiated by the controller and/or system firmware.

Currently, the memory operations are temporarily stored in the random access memory (RAM) of the non-volatile memory storage system. However, the RAM is configured to store only one of each type of deferred memory operation. For example, if the non-volatile memory storage system needs to refresh a block and, as a result, triggers a garbage collection operation, the garbage collection operation can be stored in the RAM and deferred for execution at a later time. On the other hand, if the non-volatile memory storage system needs to refresh two blocks, both garbage collection operations associated with the refreshes are not stored in the RAM. Furthermore, once a power loss occurs, the information stored in the RAM is lost and the memory operation will not be executed until the next time such memory operation is triggered. Such loss of information can lead to access errors and reduce the reliability of the non-volatile memory storage system. As a result, continuing efforts are being made to improve the storage and processing of memory operations in the non-volatile memory storage system.

SUMMARY OF THE INVENTION

The various embodiments of the present invention provide for more efficient use of a memory system through more comprehensive and integrated management of both host commands and internal operations of the memory system.

One aspect involves a priority scheme that integrates internal operations along with host commands. Tasks will be serviced in order of priority, which in some cases will mean that a host command will not be immediately serviced. Certain operations already taking place when a host command is received may be continued if it is efficient to do so. Host commands may also be slightly delayed in certain scenarios. In one embodiment the system may indicate to a host that it is idle although it is executing an operation.

Another aspect relates to an adaptive scheduling system where resources are allocated based on utilization of the memory.

BRIEF DESCRIPTION OF THE DRAWINGS

FIG. 3A is a table of general operation types and the associated priorities.

FIG. 3B is a table of operation descriptions and the associated priorities.

DETAILED DESCRIPTION OF THE PREFERRED EMBODIMENTS

Figure 1A:
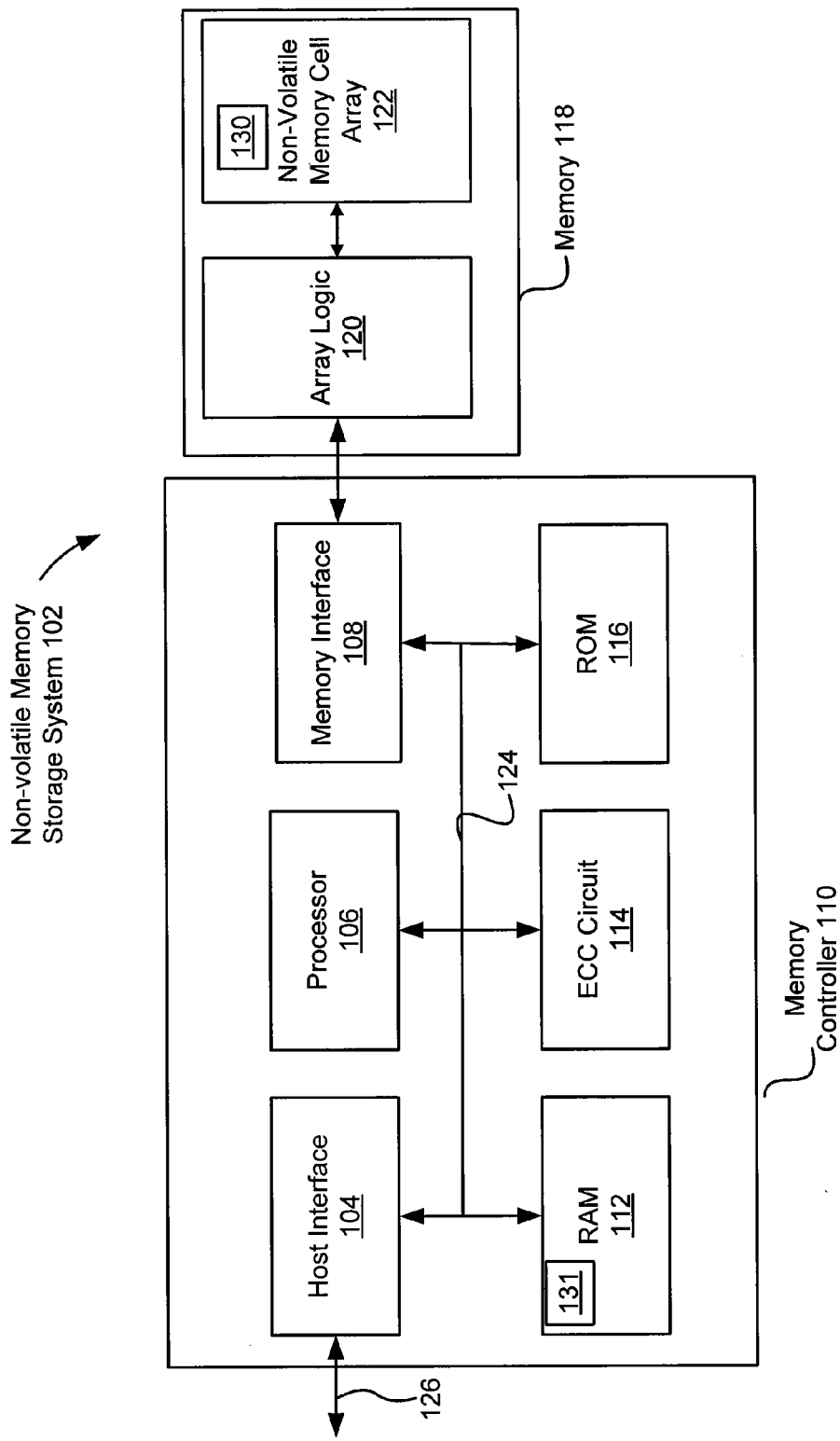
FIG. 1A is a block diagram of an embodiment of a non-volatile memory storage system 102.

FIG. 1A is a simplified block diagram of an example of a non-volatile memory storage system, in accordance with an embodiment of the present invention. A host system (e.g., desktop computers, audio players, digital cameras, mobile phones, and other computing devices) may write data to and read data from non-volatile memory storage system 102. Non-volatile memory storage system 102 may be embedded within the host or removably connected to the host. As shown in FIG. 1A, non-volatile memory storage system 102 includes memory controller 110 in communication with memory 118. In general, memory controller 110 controls the operation of memory 118.

Memory controller 110 includes bus 124 that interfaces with system bus 126 through host interface 104. Memory controller 110 further interfaces with memory 118 through memory interface 108. Host interface 104, processor 106 (e.g., microprocessor, microcontrollers, and other processors), memory interface 108, random access memory (RAM) 112, error correcting code (ECC) circuit 114, and read-only memory (ROM) 116 are in communication by way of bus 124. ROM 116 can store a storage system firmware that includes program instructions for controlling the operation of memory 118. Processor 106 is configured to execute the program instructions loaded from ROM 116 or from non-volatile memory cell array 122. The storage system firmware may be temporarily loaded into RAM 112 and additionally, the RAM may be used to buffer data that are transferred between a host and memory 118. Furthermore, RAM 112 may be configured to store queue 131 of memory operations.

ECC circuit 114 can check for errors passing through memory controller 110 between the host and memory 118. If errors are found, ECC circuit 114 can correct a number of error bits, the number depending on the ECC algorithm utilized.

Memory 118 can include array logic 120 and non-volatile memory cell array 122. Non-volatile memory cell array 122 may include a variety or a combination of non-volatile memory structures and technologies. Examples of non-volatile memory technologies include flash memories (e.g., NAND, NOR, Single-Level Cell (SLC/BIN), Multi-Level Cell (MLC), Divided bit-line NOR (DINOR), AND, high capacitive coupling ratio (HiCR), asymmetrical contactless transistor (ACT), and other flash memories), erasable programmable read-only memory (EPROM), electrically-erasable programmable read-only memory (EEPROM), read-only memory (ROM), one-time programmable memory (OTP), and other memory technologies. In addition to RAM 112, queue 130 of memory operations may also be stored in non-volatile memory cell array 122.

Furthermore, array logic 120 interfaces memory controller 110 with non-volatile memory cell array 122 and can provide, for example, addressing, data transfer and sensing, and other support to the non-volatile memory cell array. To support non-volatile memory cell array 122, array logic 120 can include row decoders, column decoders, charge pumps, word line voltage generators, page buffers, input/output buffers, address buffers, and other circuitries.

Figure 1B:
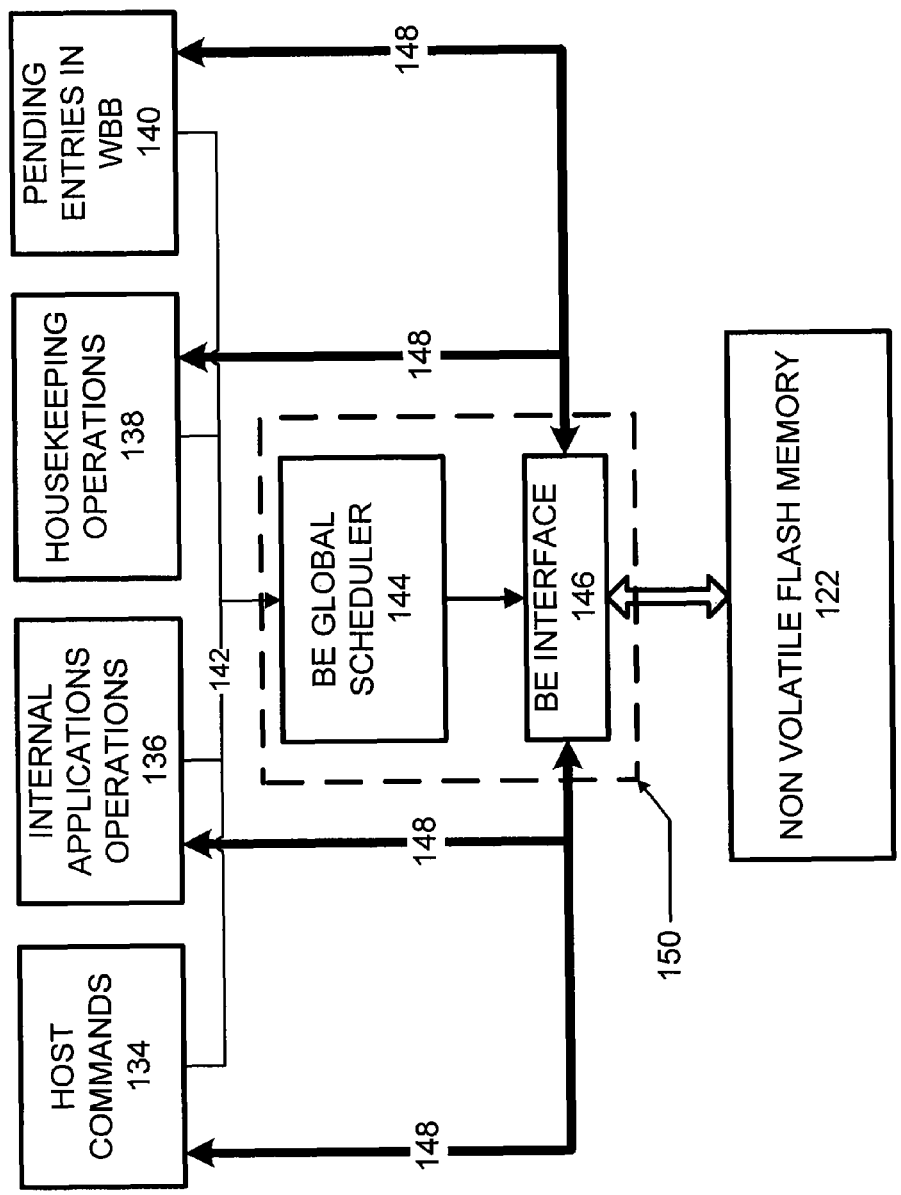
FIG. 1B is a block diagram of the various entities requiring servicing by a flash memory array of the back end of the system.

FIG. 1B illustrates the servicing of operations by the system. In general terms, such a system is often referred to as having a "front end" that handles the particulars of the host, e.g. power and clock settings and communication to the host etc., and a "back end" that comprises the flash memory module itself.

Often times the memory controller is busy doing something that is not related to the back-end. In such a case, the flash memory can perform operations rather than sit idle. For example, the memory controller may be playing an MP3 song, or running any other application. In such a case, the controller might be busy servicing the host (streaming out the song or otherwise running an application), while the BE might be idle. In this case, it is preferable that house keeping operations are executed during the idle time for the back end. This will decrease the response time, and thereby increase the performance of the system.

In general, BE idle time will be better utilized with embodiments of the present invention. Idle time may also include time between the host commands, and generally refers to time that the flash memory module is not used in servicing a host command.

For example, during a write command, the system can continue executing a housekeeping operation in (the BE flash memory in) the background while the host is sending data to the memory controller. During a read command, while the host is reading from an internal buffer (e.g. in the memory controller), the system can initiate or reinitiate a housekeeping operation in the flash memory.

The memory controller may perform actions related to the front end, which do not involve the flash memory module, or may be performing operations related to the flash memory module of the back end. As such, it may be considered as part of the "back end" and/or the "front end." Back end manager ("BEM") 150 comprises back end interface 146 and BE global scheduler 144. BE interface 146 serves to accommodate the particulars of memory 122 so that BE global scheduler ("BES") 144 can work with various different configurations/types of memory 122. BES 144 may be implemented as firmware to be executed by the memory controller and/or as hard logic within a state machine or the like.

BEM 150 in general, and BES 144 more specifically control the scheduling and servicing of operations required of memory 122. Control signals are sent/received by BES 144 over control lines 142. Data is sent/received by back end interface 146 over data bus 148, which may comprise all or some portion of buses 124 and 126 and control lines 142 of FIGS. 1A and 1B.

Host commands 134, internal applications operations 136, housekeeping operations 138, and pending entries in write cache buffer ("WCB") 140 are all managed by BES 144. In one embodiment the WCB is a portion of the flash memory array, for example a block, that is used as a cache, and may also be referred to as the write buffer block ("WBB"). In other embodiments the WCB may be a standard random access memory cache. Internal application operations 136 are operations required by applications that enhance the basic functionality of the memory system and may be loaded onto the system from time to time. Such application firmware is in addition to the operating firmware of the system. For example, a password management application or home banking software application may be added to a memory card, and such internal (as opposed to host) applications will require servicing by the back end.

Figure 2:
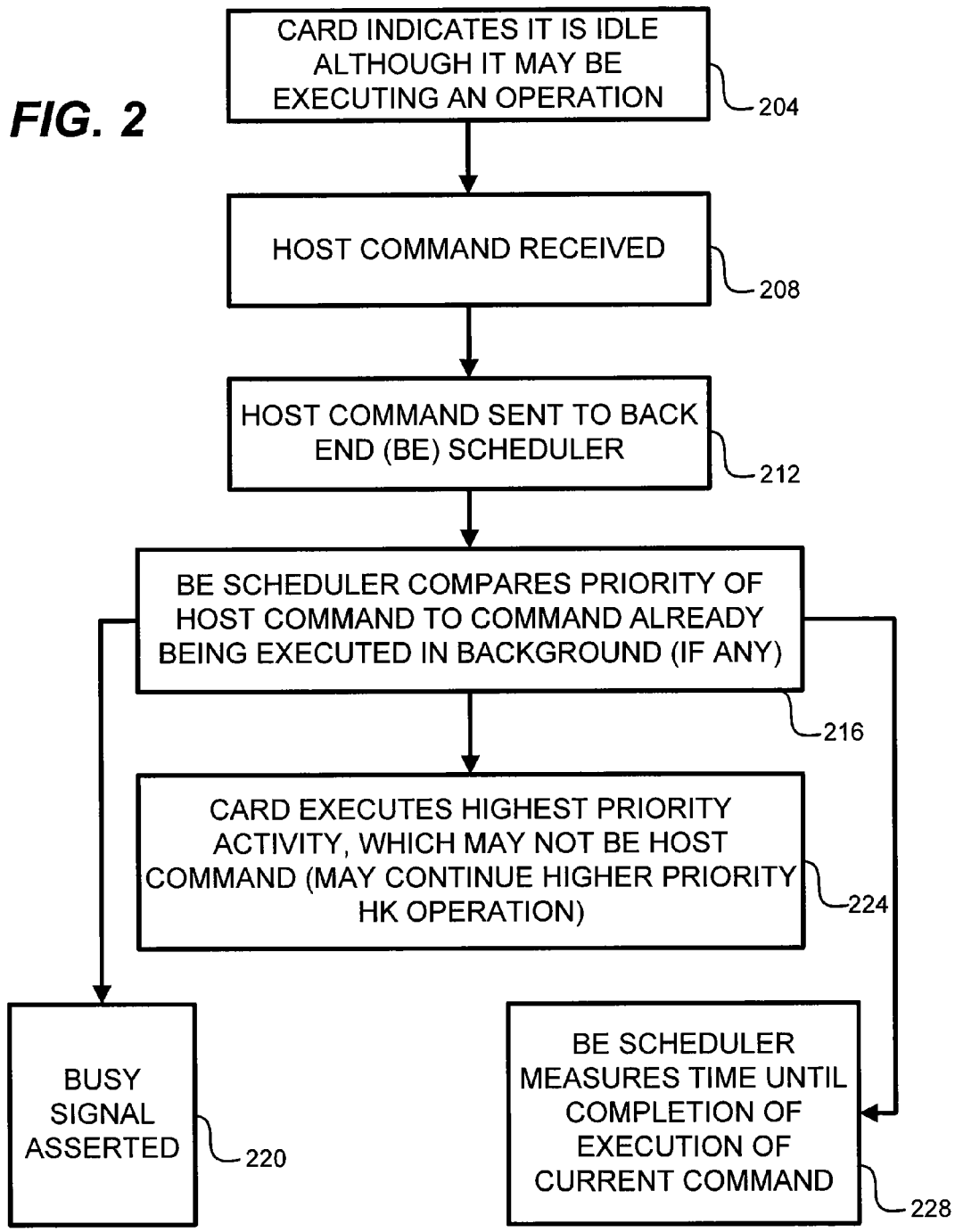
FIG. 2 is a flow chart of operations management of the system.

FIG. 2 is a flow chart illustrating an embodiment of command handling. The memory system, although it may take many forms, may hereafter be referred to as a memory card for simplicity. A memory card according to the present invention will utilize time available between host commands to perform other operations. In prior systems, when an operation was taking place, the card would indicate that it was busy. However, as represented by step 204, in this embodiment, the card will indicate it is idle although it may be executing an operation in the background. A host command received in step 208 will be sent to the back end scheduler 144 in step 212. BES 144 will then, in step 216, compare the priority of the host command received in step 208 with the command or operation already being executed in the background, if any such operation is taking place.

During the comparison of step 216, the busy signal will now be asserted, as represented by step 220. At the same time, the BE scheduler will also measure the time until completion of the execution of the current command or operation, as represented by step 228. Alternatively, rather than wait until completion of the execution, the BE scheduler will impose an upper time limit or a window of time. It will then measure elapsed time during the window or until the upper limit has been reached.

The card then executes the highest priority activity, which may not be the host command, as seen in step 224. For example a housekeeping command may be continued if that command has higher priority than the received command.

As described above, in certain embodiments BEM 150 services operations according to priority of the operations. The priority of the operations is delineated in Tables A and B below, reproduced as FIGS. 3A and 3B, respectively. Table A indicates at a high level the priority that will be associated with a general operation type. While in prior systems, a host command was generally serviced immediately (including any housekeeping operation required to properly service the command), in the present system, it has been determined that it is often more efficient to allow a housekeeping operation already being performed to be completed, and to service certain types of housekeeping commands prior to a host command, including housekeeping commands that are not needed or associated with particular host commands. Other housekeeping commands will have a lower priority, and thus a host command would have a higher priority than such a housekeeping command or operation.

TABLE A

| Priority | Operation Type |
|---|---|
| 1 | Housekeeping command needed for host command |
| 2 | Host command or internal applications command |
| 3 | Housekeeping operations (according to priority of housekeeping operation) |

Exemplary priority levels "00" through "05 are illustrated in Table B, with "00" being the highest, and "05" being the lowest priority. It should be understood that different prioritization schemes may be utilized other than that shown in Tables A and B, and that they may also change during the lifespan of the card. Cleaning entries from the WBB is very common operation and may have multiple priorities associated with it. For example, a housekeeping operation such as the cleaning of the WBB can have a priority level that varies between "02" and "05." Other types of housekeeping operations may also be assigned different and variable priority levels. Additionally, host commands can be assigned different priorities. The priorities assigned to the operations may also vary between "02" to "05", based on the level of utilization of the write buffer block 140. The utilization of the WBB can be determined many ways, but is preferably determined by comparing the number of (valid) entries in the WBB to the total number of entries that the WBB can hold. In other words, in this measure, utilization will be actual entries/capacity of entries.

TABLE B

| Priority | Description |
|---|---|
| "00" | Abort/discard/suspend current operation and start execution of the memory operation immediately. Used in cases of emergency. |
| "01" | Abort/Discard/Suspend any lower priority operation and start execution of the new operation, after the completion of any higher priority operations. Used for operations that must be performed before the host commands are performed. |
| "02" | Abort/Discard/Suspend any lower priority operation and start execution of the new operation, after the completion of any higher priority operations. Used for host commands or for high priority housekeeping operations. The housekeeping operations will be scheduled to execute in the foreground (during write/read/erase timeouts) or in the background (during host idle period) |
| "03" | Abort/Discard/Suspend any lower priority operation and start execution of the new operation, after the completion of any higher priority operations. Used for medium priority house keeping operations. The housekeeping operations will be scheduled to execute in the foreground (during write/erase timeouts) or in the background (during host idle period) |
| "04" | Abort/Discard/Suspend any lower priority operation and start execution of the new operation, after the completion of any higher priority operations. Used for low priority house keeping operations. The housekeeping operations will be scheduled to execute in the background (during host idle period) |
| "05" | Abort/Discard/Suspend any lower priority operation and start execution of the new operation, after the completion of any higher priority operations. Used for very low priority house keeping operations. The memory operations will be scheduled to execute in the background only, during host idle period. |

Figure 4:
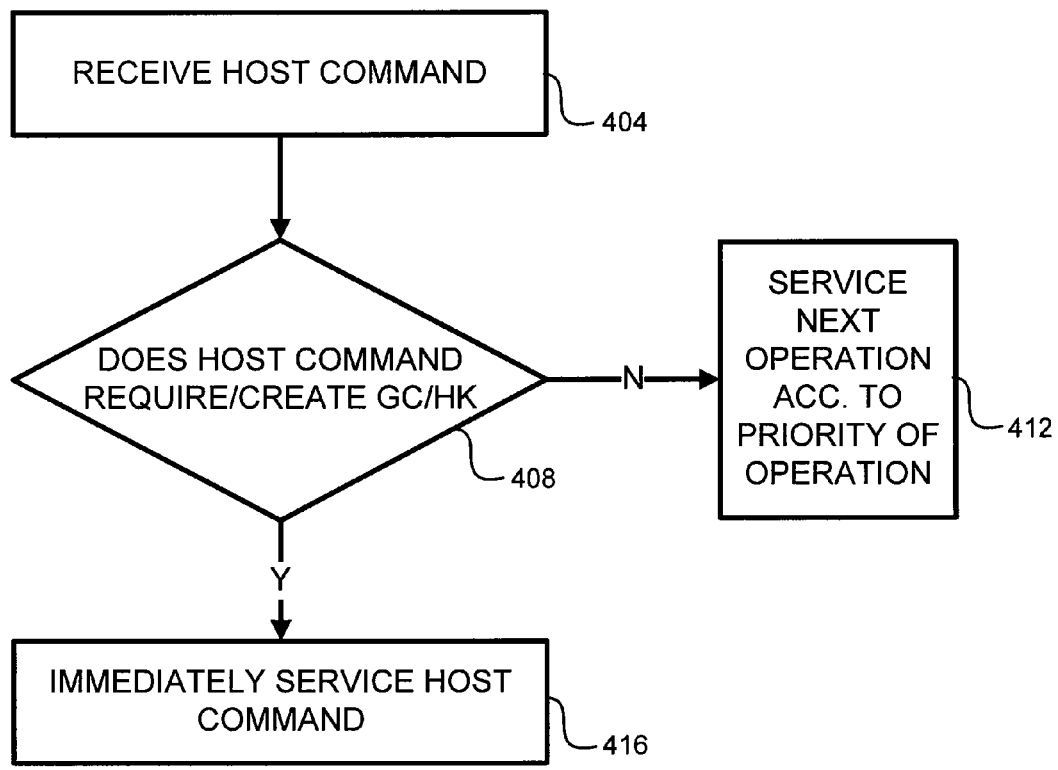
FIG. 4 is a flow chart illustrating an aspect of host command processing.

FIG. 4 is another flow chart depicting operations servicing. In step 404, a host command is received. Next, in step 408 the system determines whether the host command received in step 404 requires or creates garbage collection, or a housekeeping operation. Although garbage collection and housekeeping operations are sometimes used interchangeably in the art, garbage collection may be viewed as a subset of housekeeping operations. However, the terms are interchangeably used herein as is common in the art. If it is determined that the host command requires or creates garbage collection, the host command (including the associated garbage collection operation) is immediately serviced, as seen in step 416. If however, it does not, operations are serviced according to priority in step 412. For, example, the operations may be serviced according the priorities shown in Tables A and B.

Performance of audio/video and other high bandwidth applications may be enhanced. Certain applications require a minimum amount of bandwidth to operate properly. For example, audio/video applications require such a minimum bandwidth and predefined timeouts are typically required to accommodate such a requirement. Thus, long operations may not be able to be carried out within the time allowed. Therefore, one embodiment allows for the scheduling of operations to vary with the applications being run by the system. This is referred to as adaptive scheduling. In one embodiment, long operations, such as garbage collections invoked by FAT/DIR updates, may be divided into several shorter operations in order to meet the pre-defined timeouts imposed by those applications. Thus, the overall performance rating of a given product, such as the SD AV performance class rating, is increased and the buffer size requirements on the host are decreased.

In another embodiment, BEM 150 services operations according to the utilization of the memory. This ensures that the write cache does not become full and is always available when needed.

Figure 5:
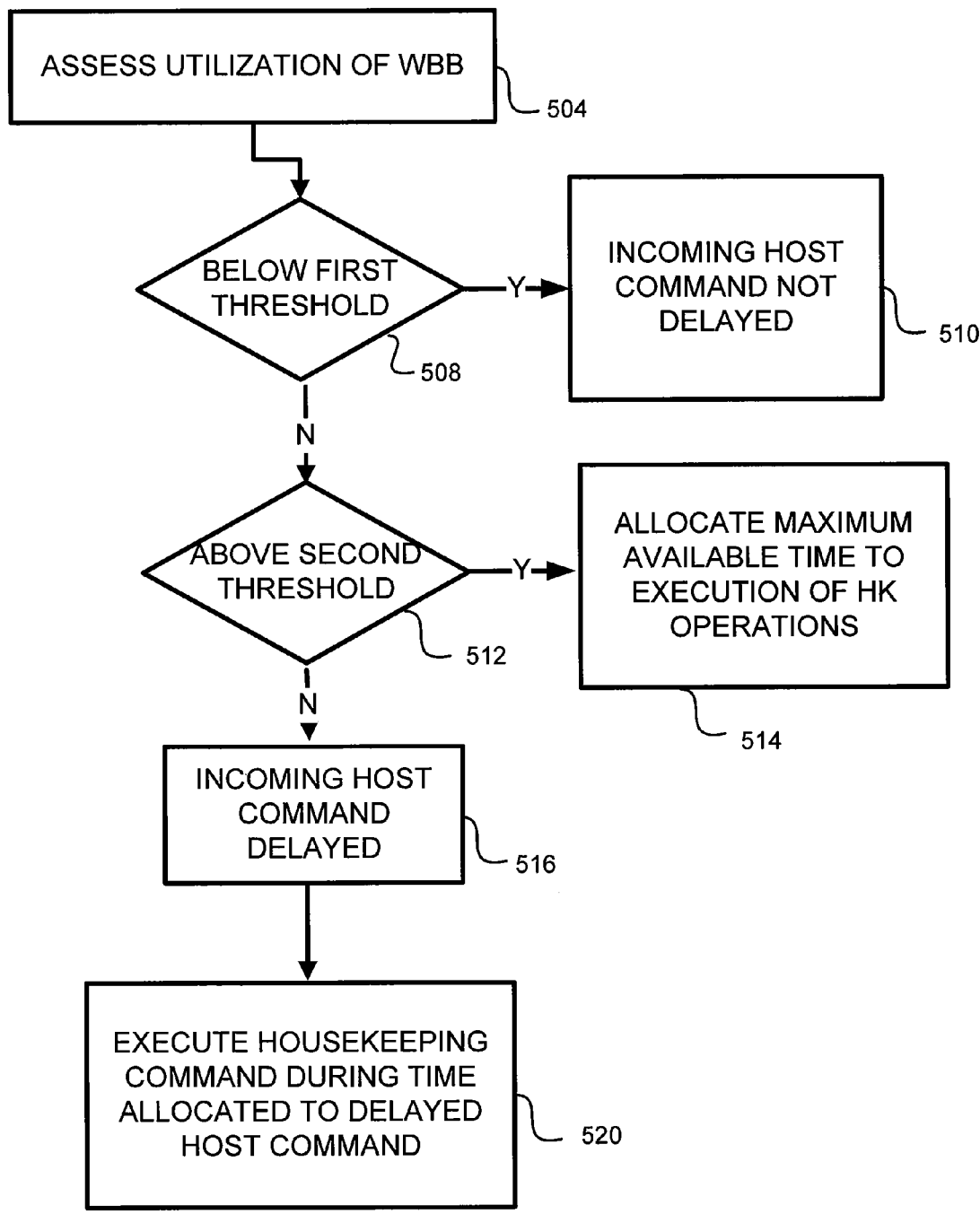
FIG. 5 is a flow chart illustrating adaptive scheduling of operations.

FIG. 5 illustrates a flow chart depicting a particular adaptive scheduling embodiment or process. In step 504, the system will assess the utilization of the write cache or WBB. As mentioned earlier, the WBB is a type of write cache that utilizes the flash memory, and although this is described as the WBB, the utilization of any cache memory, or a particular portion thereof may be measured. If the utilization is below a first threshold, as seen in step 508, an incoming host command will not be delayed, as seen in step 510. If, however, the utilization is above the first threshold, but below a second threshold as determined in step 512, an incoming host command will be delayed in step 516, and the system will execute a housekeeping command during the time allocated to the delayed host command in step 520. If, however, in step 512 it is determined that the utilization is above a second threshold, the system will allocate the maximum available time to execution of housekeeping operations.

Figure 6:
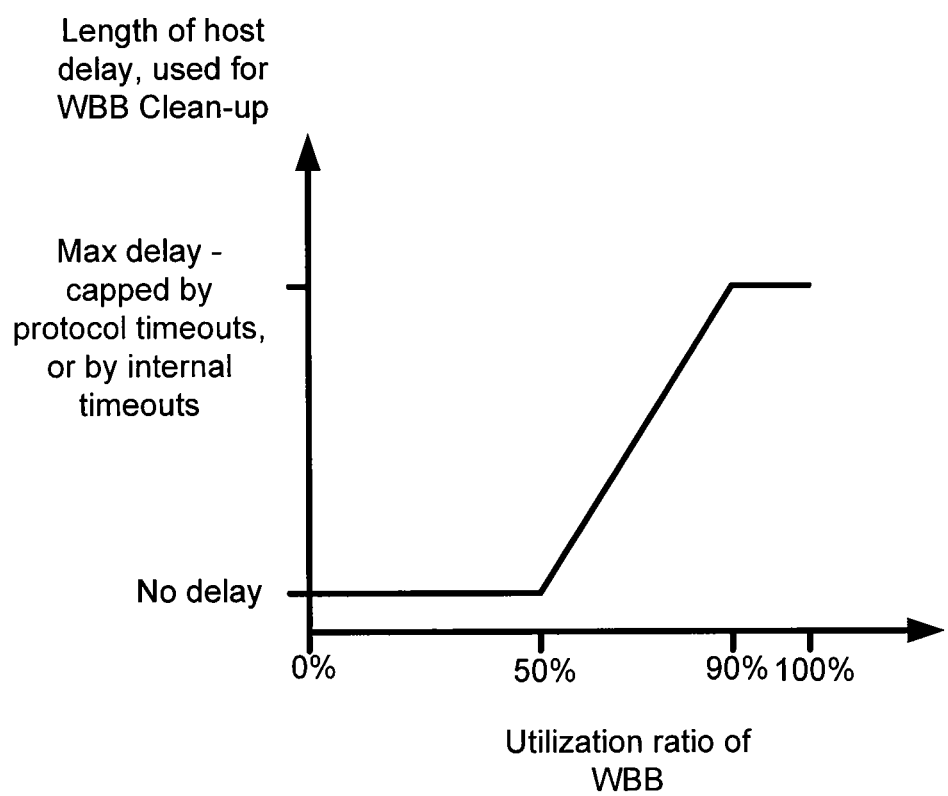
FIG. 6 is a graph of an embodiment of host delay vs. write cache utilization.

FIG. 6 illustrates that a delay may also vary according to the utilization ratio of the WBB. As seen in FIG. 6, if the WBB is less than 50% full, a performance penalty is not incurred and the host is not stalled in order to clean the WBB—everything is done in the background (lower priority). When the WBB utilization exceeds 50% the host command processing is delayed according to the utilization ratio until a maximum limit is approached, after which the full available time window is used for clean-up and to execute the host command. While FIG. 6 indicates a linear increase, the change need not be linear and can be initiated at any percentage other than 50%, as the figure is only meant to provide an example.

What is claimed is:

1. A method of operating a flash memory storage device, the method comprising:
receiving a host command that is sent from a host device to the flash memory storage device;

after receiving the host command, determining that the received host command does not require garbage collection before the received host command can be properly executed and determining that another operation has a higher priority than the received host command;

after receiving the host command, servicing the other operation that has been determined to have a higher priority than the received host command while delaying servicing of the received host command sent from the host device to the flash memory storage device; and after servicing the other operation, servicing the received host command.

2. The method of claim 1, the method further comprising: receiving a second host command from a host device;

determining that the received second host command does require garbage collection before the received second host command can be properly executed; and performing the required garbage collection operation for the received second host command and then carrying out the received second host command.

3. The method of claim 1, further comprising storing other pending operations and the received host command in a queue and scheduling the other pending operations and the received host command according to a priority associated with each of the other pending operations and the received host command.

4. The method of claim 1, further comprising:

prioritizing a group of operations including host commands and internal operations of the storage system in a unified priority scheme; and delaying execution of at least one host command to complete an existing housekeeping operation.

5. The method of claim 4, wherein internal operations comprise housekeeping operations, operations generated by application firmware, and pending entries in a cache memory of the system.

6. The method of claim 4, wherein scheduling of the prioritized group of operations is controlled by firmware executed by the memory controller of the system.

7. The method of claim 4, wherein scheduling of the prioritized group of operations is controlled by a state machine implemented in hardware of the system.

8. A method of operating a flash memory storage system coupled to a host computer, the method comprising:

executing a housekeeping operation of the storage system while sending an idle signal from the storage system to the host computer indicating to the host that the storage system is idle;

receiving a host command from the host computer at the storage system after the idle signal has been sent to the host computer and while the housekeeping operation is still being executed and while the storage system is still indicated as being idle;

comparing a priority associated with the received host command to a priority associated with the housekeeping operation being executed;

sending a busy signal from the memory system to the host computer indicating that the storage system is busy while the comparison takes place; and in response to the comparison indicating that the priority associated with the received host command is lower than the priority of the housekeeping operation being executed, continuing execution of the housekeeping operation being executed while delaying servicing of the received host command.

9. The method of claim 8, further comprising:

executing a second housekeeping operation of the storage system while sending a second idle signal from the storage system to the host computer indicating to the host that the storage system is idle;

receiving a second host command from the host computer at the storage system after the second idle signal has been sent to the host computer and while the second housekeeping operation is still being executed and while the storage system is still indicated as being idle;

comparing a priority associated with the received second host command to a priority associated with the second housekeeping operation being executed;

sending a busy signal from the memory system to the host computer indicating that the storage system is busy while the second comparison takes place; and in response to the comparison indicating that the priority associated with the received second host command is higher than the priority of the second housekeeping operation being executed, executing the received second host command while delaying execution of the second housekeeping operation.

10. A method of maximizing the utilization of a flash memory storage system comprising a memory controller and flash memory module, the method comprising:

assigning a priority level to one or more types of housekeeping operations higher than a priority level of one or more types of commands received by a host coupled to the storage system;

receiving a host command sent from a host device to the storage system;

after receiving the host command, comparing a priority level of the host command to a priority level of a housekeeping operation; and performing at least a portion of one housekeeping operation that is not required by the received host command and is determined to have a higher priority level than the received host command while halting servicing of the received host command.

11. A method of maximizing the utilization of a flash memory storage system comprising a memory controller and flash memory module, the method comprising:

utilizing a write buffer block of the system as a queue for operations, including a plurality of host commands, of the system;

assessing a degree of utilization of the write buffer block;

receiving a new host command sent from a host device to the flash memory storage system; and after receiving the new host command, scheduling operations, including the host commands, utilizing the flash memory module based upon the assessed degree of utilization, wherein scheduling comprises determining whether to delay the received new host command while servicing a housekeeping operation that is not required for execution of the received new host command, based upon the assessed degree of utilization of the write buffer block.

12. The method of claim 11, wherein if the assessed degree of utilization is determined to be above a threshold, available time is allocated to servicing of housekeeping operations.

13. The method of claim 11, wherein if the assessed degree of utilization is determined to be below a threshold:

available time is first allocated to a host command; and immediately after the window of time required for the host command, short portions of time are allocated to one or more housekeeping operations.

14. The method of claim 13, wherein if the assessed degree of utilization is below the threshold, one or more housekeeping operations are scheduled for background execution.

15. The method of claim 11, wherein if the assessed degree of utilization is determined to be below a first threshold, the received new host command is not delayed.

16. The method of claim 15, wherein if the assessed degree of utilization is determined to be above the first threshold but below a second threshold:
the received new host command is delayed; and
available time is first allocated to a housekeeping operation during the delay of the received new host command.

17. The method of claim 16, wherein if the assessed degree of utilization is determined to be above the second threshold, a maximum amount of allocable available time before and after the received new host command is allocated to housekeeping operations.

18. A flash memory storage system comprising:
a memory controller;
a flash memory module for receiving host commands; and
a back end manager for prioritizing data storage operations of the flash memory module,
the back end manager configured for:
receiving a host command that is sent from a host device to the flash memory storage system;
after receiving the host command, determining that a received host command does not require garbage collection before the received host command can be properly executed and determining that another operation has a higher priority than the received host command;
after receiving the host command, servicing the other operation that has been determined to have a higher priority than the received host command while delaying servicing of the received host command sent from the host device to the flash memory storage system; and
after servicing the other operation, servicing the received host command.

19. The flash memory storage system of claim 18, wherein the back end manager comprises firmware of the system.

20. The flash memory storage system of claim 18, wherein the back end manager comprises a state machine.

21. A flash memory storage system comprising:
a memory controller; and
a flash memory module,
the memory controller configured for:
assigning a priority level to one or more types of housekeeping operations higher than a priority level of one or more types of commands received by a host coupled to the storage system;
receiving a host command sent from a host device to the flash memory storage system;
after receiving the host command, comparing a priority level of the host command to a priority level of a housekeeping operation; and
performing at least a portion of one housekeeping operation that is not required by the received host command determined to have a higher priority level than the received host command while inhibiting servicing of the received host command and before servicing the received host command.

* * * * *